United States Patent
Miyamoto et al.

(10) Patent No.: US 11,952,008 B2
(45) Date of Patent: Apr. 9, 2024

(54) DRIVING ASSISTANCE DEVICE FOR VEHICLE AND DRIVING ASSISTANCE METHOD FOR VEHICLE

(71) Applicants: DENSO CORPORATION, Kariya (JP); TOYOTA JIDOSHA KABUSHIKI KAISHA, Toyota (JP)

(72) Inventors: Yousuke Miyamoto, Kariya (JP); Masumi Fukuman, Kariya (JP); Akihiro Kida, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 17/658,079

(22) Filed: Apr. 5, 2022

(65) Prior Publication Data
US 2022/0227385 A1    Jul. 21, 2022

Related U.S. Application Data

(63) Continuation of application No. PCT/JP2020/033409, filed on Sep. 3, 2020.

(30) Foreign Application Priority Data

Oct. 11, 2019  (JP) ................................. 2019-188085

(51) Int. Cl.
*G08B 25/00*    (2006.01)
*B60W 30/095*    (2012.01)
(Continued)

(52) U.S. Cl.
CPC ........ *B60W 50/16* (2013.01); *B60W 30/0956* (2013.01); *B60W 40/04* (2013.01);
(Continued)

(58) Field of Classification Search
CPC .. B60W 50/16; B60W 30/0956; B60W 40/04; B60W 2050/143; B60W 2050/146;
(Continued)

(56) References Cited

U.S. PATENT DOCUMENTS 5,865,265 A * 2/1999 Matsumoto ........... G01S 13/931
340/901
6,150,932 A * 11/2000 Kenue ................... B60Q 9/008
340/904
(Continued)

FOREIGN PATENT DOCUMENTS

JP    4385852 B2    12/2009

*Primary Examiner* — Toan N Pham
(74) *Attorney, Agent, or Firm* — MASCHOFF BRENNAN (57) ABSTRACT

An obstacle in a periphery of the vehicle is detected using a peripheral monitoring sensor for monitoring the periphery of the vehicle. It is sequentially determined whether an avoidance of the obstacle is necessary, according to a route of the vehicle. A warning device is controlled to issue a warning when determining that the avoidance of the obstacle is necessary. In a case where determining that the avoidance of the obstacle is unnecessary after starting the warning, the warning device is controlled to continue issuing the warning when an obstacle distance is less than a predetermined threshold value set in advance.

8 Claims, 5 Drawing Sheets

(51) Int. Cl.
    *B60W 40/04*     (2006.01)
    *B60W 50/16*     (2020.01)
    *G06V 20/58*     (2022.01)
    *B60W 50/14*     (2020.01)

(52) U.S. Cl.
    CPC ....... *G06V 20/58* (2022.01); *B60W 2050/143* (2013.01); *B60W 2050/146* (2013.01); *B60W 2420/42* (2013.01); *B60W 2554/801* (2020.02)

(58) Field of Classification Search
    CPC ....... B60W 2420/42; B60W 2554/801; B60W 50/0097; B60W 2520/00; B60W 50/14; B60W 30/0953; B60W 40/02; B60W 40/10; B60W 40/105; B60W 40/107; B60W 40/112; B60W 2520/10; B60W 2520/105; B60W 2552/50; G06V 20/58; G08G 1/165; G08G 1/166; B60Q 9/008
    See application file for complete search history.

(56) References Cited

U.S. PATENT DOCUMENTS

| | | | |
|---|---|---|---|
| 6,871,145 B2 * | 3/2005 | Altan | ............... G08G 1/166 |
| | | | 340/436 |
| 7,696,863 B2 * | 4/2010 | Lucas | ............... B60Q 9/008 |
| | | | 340/435 |
| 2019/0100197 A1 | 4/2019 | Saiki | |
| 2021/0107471 A1 | 4/2021 | Saiki | |
| 2022/0048501 A1 | 2/2022 | Saiki | |

* cited by examiner

| | A | B | C |
|---|---|---|---|
| SITUATION | AVOIDANCE UNNECESSARY | AVOIDANCE NECESSARY → WARNING START | WARNING START → AVOIDANCE UNNECESSARY |
| DISPLAY | NO DISPLAY | (M) | (M) |
| BUZZER | NO BUZZER | BUZZER | BUZZER |

FIG. 3

AVOIDANCE NECESSARY

| OBSTACLE DISTANCE [cm] | MARK DISPLAY | SOUND BUZZER |
|---|---|---|
| 0 - | RED | BUZZER (CONTINUOUSLY) |

AVOIDANCE UNNECESSARY

| OBSTACLE DISTANCE [cm] | MARK DISPLAY | SOUND BUZZER |
|---|---|---|
| 0 - 15 | RED | BUZZER (CONTINUOUSLY) |
| 15 - 30 | YELLOW | NO BUZZER |
| 30 - | NO MARK | NO BUZZER |

FIG. 4

AVOIDANCE UNNECESSARY

| OBSTACLE DISTANCE [cm] | MARK DISPLAY | SOUND BUZZER |
|---|---|---|
| 0 - 15 | YELLOW | INTERMITTENTLY |
| 15 - 30 | YELLOW | NO BUZZER |
| 30 - | NO MARK | NO BUZZER |

FIG. 5

AVOIDANCE UNNECESSARY

| OBSTACLE DISTANCE [cm] | MARK DISPLAY | SOUND BUZZER |
|---|---|---|
| 0 - 15 | RED | INTERMITTENTLY |
| 15 - 30 | YELLOW | NO BUZZER |
| 30 - | NO MARK | NO BUZZER |

FIG. 6

AVOIDANCE UNNECESSARY

| OBSTACLE DISTANCE [cm] | MARK DISPLAY | SOUND BUZZER |
|---|---|---|
| 0 - 15 | YELLOW | BUZZER (CONTINUOUSLY) |
| 15 - 30 | YELLOW | NO BUZZER |
| 30 - | NO MARK | NO BUZZER |

FIG. 7

DRIVING ASSISTANCE DEVICE FOR VEHICLE AND DRIVING ASSISTANCE METHOD FOR VEHICLE

CROSS REFERENCE TO RELATED APPLICATION

The present application is a continuation application of International Patent Application No. PCT/JP2020/033409 filed on Sep. 3, 2020, which designated the U.S. and claims the benefit of priority from Japanese Patent Application No. 2019-188085 filed on Oct. 11, 2019. The entire disclosures of all of the above applications are incorporated herein by reference.

TECHNICAL FIELD

The present disclosure relates to a driving assistance device for a vehicle and a driving assistance method for a vehicle.

BACKGROUND

A technique for detecting an obstacle around a vehicle and issuing an alarm is known. For example, a conceivable technique teaches a technique for issuing an alarm when there is an obstacle within a predetermined detection distance, but not issuing an alarm when there is no obstacle within the detection distance. Further, in the conceivable technique, by setting the detection distance (hereinafter, detection area) of each sensor corresponding to the trajectory of the planned course of the vehicle, it is possible to determine whether a vehicle can pass through the obstacle and proceed the course only by determining whether or not an obstacle exists in the detection area. Further, the conceivable technique teaches that even when an obstacle is relatively close to the vehicle, an alarm is not issued when the obstacle is outside the detection area.

SUMMARY

According to an example, an obstacle in a periphery of the vehicle is detected using a peripheral monitoring sensor for monitoring the periphery of the vehicle. It is sequentially determined whether an avoidance of the obstacle is necessary, according to a route of the vehicle. A warning device is controlled to issue a warning when determining that the avoidance of the obstacle is necessary. In a case where determining that the avoidance of the obstacle is unnecessary after starting the warning, the warning device is controlled to continue issuing the warning when an obstacle distance is less than a predetermined threshold value set in advance.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In the conceivable technique, when an obstacle is avoided by steering or the like and the obstacle is disposed outside of the detection area, the warning is terminated even if the obstacle is relatively close to the vehicle. When the warning is terminated, it becomes difficult for the vehicle driver to know how close the obstacle is. Therefore, there may be a possibility that the driver mistakenly steers in a direction close to the obstacle and approaches the obstacle.

Thus, a driving assistance device for a vehicle and a driving assistance method for a vehicle that make it easier to avoid proximity to an obstacle once after the obstacle as a target of warning has been avoided are provided.

In order to achieve the above object, the driving assistance device for a vehicle of the present embodiments is used for a vehicle, and includes: an obstacle detection unit that detects an obstacle in the vicinity of the vehicle by using the sensing result of a peripheral monitoring sensor for monitoring the periphery of the vehicle; an avoidance determination unit that sequentially determines the necessity of avoiding the obstacle detected by the obstacle detection unit according to the route of the vehicle; and a warning processing unit that issues an alarm from the alarm device when the avoidance determination unit determines that the avoiding of the obstacle is necessary. Even if the avoidance determination unit determines that the avoiding of the obstacle is unnecessary after starting the warning, when the obstacle distance that is a distance between the vehicle and the obstacle is less than a set threshold preliminarily set, the warning processing unit continues to issue the warning from the warning device.

In order to achieve the above object, the driving assistance method for a vehicle of the present embodiments is used for a vehicle, and includes: detecting an obstacle in the vicinity of the vehicle by using the sensing result of a peripheral monitoring sensor that monitors the periphery of the vehicle; sequentially determining the necessity of avoiding the detected obstacle according to the route of the vehicle; issuing the warning from the warning device when determining that the avoiding of the detected obstacle is necessary. Even if determining that the avoiding of the obstacle is unnecessary after starting the warning, when the obstacle distance that is a distance between the vehicle and the obstacle is less than a set threshold preliminarily set, the warning from the warning device is continued to issue.

According to these, the necessity of avoiding the obstacle is determined according to the route of the vehicle. Therefore, even if it is once determined that the avoidance of the obstacle is necessary, the determination may be switched to the determination that the avoidance of the obstacle is unnecessary, due to the change of the route by steering. However, even when the course of the vehicle changes and it is determined that avoidance of the obstacle is unnecessary, the obstacle may be located at a relatively short distance to the vehicle. On the other hand, even when it is determined that the obstacle avoidance is unnecessary after the alarm is started due to the determination that the obstacle avoidance is necessary, the obstacle distance, which is the distance of the obstacle to the vehicle, is less than the predetermined threshold value set in advance, the alarm from the alarm device is continued. Therefore, even when it is determined that avoidance of an obstacle is unnecessary, it is possible to continue the warning when the obstacle is located at a relatively short distance of the vehicle. When the alarm is continued, the vehicle driver will continue to pay attention to the surroundings, so that the driver can easily avoid proximity to the obstacle even if the obstacle is located relatively close to the vehicle. As a result, it becomes possible to make it easier to avoid the proximity to the obstacle after the obstacle that has been the target of the alarm has been avoided once.

Multiple embodiments will be described with reference to the drawings. For convenience of description, the parts having the same functions as the parts shown in the drawings used in the description up to that point in multiple embodiments may be designated by the same reference numerals and the description thereof may be omitted. Description in another applicable embodiment may be referred to for such a portion denoted by the identical reference symbols.

First Embodiment

<Schematic Configuration of Vehicle System 1>

Figure 1:
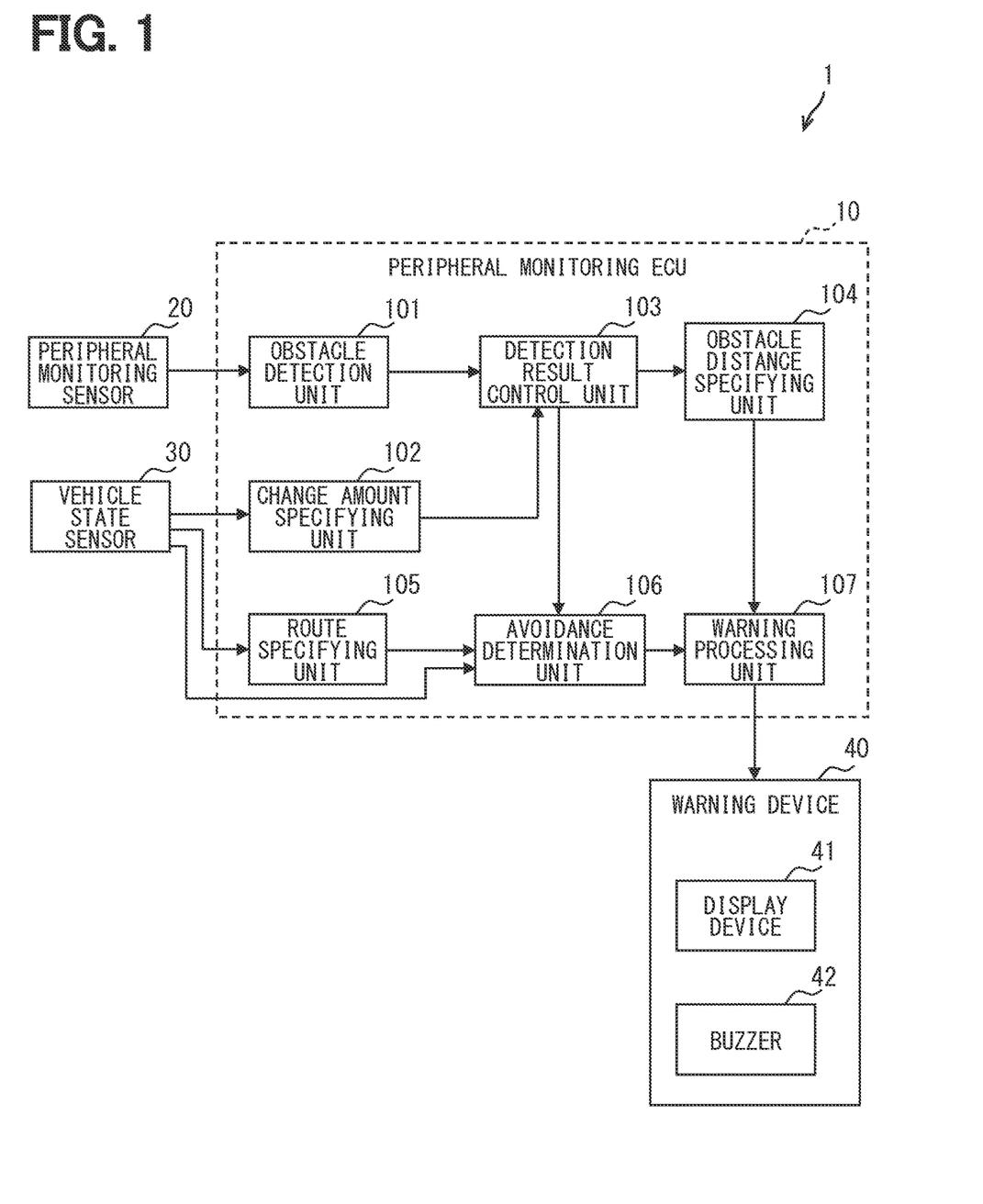
FIG. 1 is a diagram showing an example of a schematic configuration of a vehicle system and a peripheral monitoring ECU.

Hereinafter, Embodiment 1 of the present disclosure will be described with reference to drawings. The vehicle system 1 shown in FIG. 1 is used in a vehicle. As shown in FIG. 1, the vehicle system 1 includes a peripheral monitoring ECU 10, a peripheral monitoring sensor 20, a vehicle state sensor 30, and an alarm device 40. Although the vehicle using the vehicle system 1 is not necessarily limited to an automobile, hereinafter, an example using the automobile will be described.

The peripheral monitoring sensor 20 is an autonomous sensor that monitors the peripheral environment of the subject vehicle. The peripheral monitoring sensor 20 is used to detect an object (that is, an obstacle) around the subject vehicle. For example, the peripheral monitor sensor 20 is a peripheral monitor camera that captures a predetermined range around the subject vehicle, and a distance measurement sensor that transmits a scanning wave to a predetermined range around the subject vehicle such as a millimeter wave radar, a sonar, or a lidar. The distance measurement sensor is a sensor that transmits the scanning wave and receives the reflected wave of the scanning wave reflected by the obstacle within the reach range of the scanning wave to detect the existence of the obstacle and the distance to the obstacle.

In the distance measurement sensor, the received information of the reflected wave of the scanning wave is the sensing result. The peripheral monitoring cameras can detect the presence of obstacles in captured images using image recognition processing. In the peripheral monitoring camera, the captured image is the sensing result. In addition, the peripheral monitoring camera can detect the distance of an obstacle with respect to the subject vehicle (hereinafter referred to as the obstacle distance) based on the captured image. As an example, the obstacle distance may be detected by calculating from the pixel position in the vertical direction of the portion where the obstacle is recognized in the captured image. As the peripheral monitoring sensor, for example, a configuration in which a plurality of types of peripheral monitoring sensors 20 may be used in combination so as to cover the entire circumference of the subject vehicle may be used. As an example, a peripheral monitoring camera and a distance measurement sensor may be used in combination.

The vehicle state sensor 30 is a sensor group for detecting various states of the subject vehicle, such as a traveling state. The vehicle state sensor 30 includes a vehicle speed sensor, a steering sensor, an acceleration sensor, a yaw rate sensor, and the like. The vehicle speed sensor is configured to detect the speed of the subject vehicle. The steering sensor is configured to detect the steering angle of the subject vehicle. The acceleration sensor is configured to detect the acceleration in a front-rear direction of the subject vehicle, the acceleration in a left-right direction, and the like. The acceleration sensor is configured to detect the deceleration that is a negative acceleration. The yaw rate sensor is configured to detect the angular velocity of the subject vehicle.

The alarm device 40 gives an alarm to the driver of the subject vehicle. The alarm device 40 may include at least a display device 41 and a buzzer 42. The display device 41 gives an alarm to the driver by the display. The display device 41 alerts the driver by displaying an image, an icon, text, or the like on the display, for example. The display device 41 may be configured to use, for example, a CID (Center Information Display). The CID is arranged, for example, in the center cluster of the vehicle. The display device 41 may be configured to use another display such as a display of a navigation device or a HUD (Head-Up Display). The buzzer 42 alerts the driver by ringing. Hereinafter, the case where the alarm device 40 includes the display device 41 and the buzzer 42 will be described as an example.

The peripheral monitoring ECU 10 includes, for example, a processor, a memory, an I/O, and a bus connecting these, and by executing a control program stored in the memory, a process (hereinafter, alarm-related process) related to an alarm about an obstacle around the subject vehicle is executed. The memory referred to here is a non-transitory tangible storage medium that stores programs and data that can be read by a computer. Further, the non-transitory tangible storage medium is realized by a semiconductor memory, a magnetic disk, or the like. The peripheral monitoring ECU 10 corresponds to a vehicle driving assistance device. The details of the peripheral monitoring ECU 10 will be described below.

<Rough Configuration of Peripheral Monitoring ECU 10>

Subsequently, the schematic configuration of the peripheral monitoring ECU 10 will be described with reference to FIG. 1. As shown in FIG. 1, the peripheral monitoring ECU 10 includes an obstacle detection unit 101, a change amount specifying unit 102, a detection result management unit 103, an obstacle distance specifying unit 104, a route specifying unit 105, an avoidance determination unit 106, and a warning processing unit 107 provided as a functional block. In addition, a part or all of the functions executed by the peripheral monitoring ECU 10 may be configured as a hardware, such as one or more of ICs or the like. Alternatively, a part or all of functional blocks of the peripheral monitoring ECU 10 may be implemented by a combination of a software executed by at least one processor and a hardware.

The obstacle detection unit 101 detects obstacles around the subject vehicle by using the sensing result of the peripheral monitoring sensor 20. The obstacle detection unit 101 detects the presence of obstacles around the subject vehicle and the position with respect to the subject vehicle. The position with respect to the subject vehicle may be specified based on the distance from the peripheral monitoring sensor 20 to the obstacle, which is specified by using the sensing result of the peripheral monitoring sensor 20, the direction to the obstacle that is specified based on the detection direction of the peripheral monitoring sensor 20 with respect to the subject vehicle, and the mounting position of the peripheral monitoring sensor 20 with respect to the reference point of the subject vehicle. The reference point of the subject vehicle may be configured to be appropriately determined. As an example, the position at the center of the rear wheel axle in the vehicle width direction may be set as the reference point. Alternatively, a point on the center line of the vehicle equidistant from both sides of the subject vehicle, which is the same distance between the front end and the rear end of the vehicle may be used as a reference point. The position of the obstacle with respect to the subject vehicle may be represented as coordinates in the XY coordinate system with the reference point of the subject vehicle as the original point. In this XY coordinate system, the X-axis and the Y-axis are placed in a horizontal plane parallel to the road surface.

Information such as the detection direction of the peripheral monitoring sensor 20 for the subject vehicle and the mounting position of the peripheral monitoring sensor 20 with respect to the reference point of the subject vehicle is configured to be stored in advance in the non-volatile memory of the peripheral monitoring ECU 10. Regarding the direction of the obstacle, when the peripheral monitoring sensor 20 is a distance measuring sensor, it may be configured to detect the direction of the obstacle based on the time difference between two elements for receiving the reflected wave for the same scanning wave by providing two elements for receiving the reflected wave.

The position of the obstacle with respect to the subject vehicle to be detected by the obstacle detection unit 101 is the position of the obstacle detection point. When the peripheral monitoring sensor 20 is a distance measuring sensor, the detection point corresponds to a reflection point where an obstacle reflects the scanning wave. When the peripheral monitoring sensor 20 is a peripheral monitoring camera, the detection point corresponds to, for example, a feature point of an obstacle that has been image-recognized. The obstacle detection unit 101 sequentially detects the position of the detection point of the obstacle.

The change amount specifying unit 102 specifies the change amount of the subject vehicle position in a predetermined period based on the running state of the subject vehicle sequentially detected by the vehicle state sensor 30. The position of the subject vehicle may be set as the reference point of the subject vehicle. For example, the change amount specifying unit 102 may specify the change amount of the subject vehicle position for each cycle of sensing of the peripheral monitoring sensor 20 which periodically performs the detection of the position of the detection point of the obstacle. As an example, the change amount specifying unit 102 specifies the change amount of the subject vehicle position from the vehicle speed of the subject vehicle sequentially detected by the vehicle speed sensor and the steering angle of the subject vehicle sequentially detected by the steering angle sensor.

The detection result management unit 103 manages information about at least one detection point detected by the obstacle detection unit 101 as detection point management data. The detection point management data is data in which the relative position of the detection point with respect to the current position of the subject vehicle is represented by the XY coordinate system with the reference point of the subject vehicle as the original point. The detection point management data is stored in the memory of the peripheral monitoring ECU 10. The memory may be, for example, a volatile memory. The detection point management data is sequentially updated as the position of the vehicle changes or the detection points are added. For example, the detection result management unit 103 may be configured to manage the information about each detection point in the order of the acquired time series.

The detection result management unit 103 sequentially updates the position of the detection point in the XY coordinate system according to the change in the position of the subject vehicle. As an example, the detection result management unit 103 applies a change in the position according to the amount of change in the position of the subject vehicle specified by the change amount specifying unit 102 to the position of the detection point, so that the position of the detection point in the XY coordinate system can be updated. As a result, even if the detection point deviates from the detection range of the peripheral monitoring sensor 20, the relative position of each detection point with respect to the subject vehicle position is continuously specified.

When a plurality of detection points can be regarded as detection results for the same obstacle, the detection result management unit 103 manages them as one group (hereinafter referred to as a group) by associating them with each other. For example, when the distance between the detection points is less than the distance for distinguishing whether or not the detection points belong to the same obstacle, it may be determined as the detection points for the same obstacle. Further, in a point group in which a plurality of detection points are arranged in chronological order, detection points belonging to a part that can be approximated by a function such as an ellipse or a parabola may be detection points for the same obstacle.

When the detection result management unit 103 can identify the contour shape of the detected obstacle from the point group of the grouped detection points, the region forming this contour shape may be regarded as the region where one obstacle exists. Further, the area behind the specified contour shape as seen from the vehicle may be regarded as the area where the obstacle exists. The contour shape of the obstacle may be represented by a linear approximation curve calculated with a plurality of detection points for the same obstacle as a population. Further, the contour shape of the obstacle may be one in which a plurality of detection points for the same obstacle are connected in chronological order.

The obstacle distance specifying unit 104 specifies the distance of the obstacle to the subject vehicle (hereinafter referred to as the obstacle distance). As an example, the obstacle distance specifying unit 104 may specify the distance between the outer surface of the subject vehicle and the detection point of the obstacle, which is the closest to each other, as the distance of the obstacle to the subject vehicle. The position of the outer surface with respect to the reference point of the subject vehicle may be specified, for example, from the vehicle body shape information of the subject vehicle stored in advance in the non-volatile memory of the peripheral monitoring ECU 10. The obstacle distance may be the distance between the reference point of the subject vehicle and the detection point of the obstacle, which is the closest to each other. Further, the obstacle distance may be the distance between the installation position of the peripheral monitoring sensor 20 of the subject vehicle and the detection point of the obstacle, which is the closest to each other.

The route specifying unit 105 specifies the route of the subject vehicle. When the route of the subject vehicle may be a predicted locus of the reference point of the subject vehicle specified from the steering angle of the subject vehicle detected by the steering angle sensor of the vehicle state sensor 30 and the vehicle speed of the subject vehicle detected by the vehicle speed sensor. Further, the route of the subject vehicle may be the direction with respect to the reference point of the subject vehicle indicated by the steering angle of the subject vehicle detected by the steering angle sensor of the vehicle state sensor 30.

The avoidance determination unit 106 sequentially determines whether or not the obstacle detected by the obstacle detection unit 101 needs to be avoided according to the route of the subject vehicle specified by the route specifying unit 105. As an example, when the obstacle detected by the obstacle detection unit 101 is included in the passage area of the vehicle estimated from the route of the vehicle specified by the route specifying unit 105, it is determined that the obstacle avoidance is necessary. The passage area is an area estimated to be necessary for the passing of the subject vehicle, which is determined along the route of the subject vehicle. On the other hand, when the obstacle detected by the obstacle detection unit 101 is not included in the passage area, it may be determined that avoidance of the obstacle is unnecessary. The avoidance determination unit 106 may define that the obstacle is included in the passage area even if a part of the detection point of the obstacle is included in the passage area. The avoidance determination unit 106 may estimate the passage area of the subject vehicle from the route of the subject vehicle and the vehicle width information of the subject vehicle in the above-mentioned vehicle body shape information. The width of the passage area may be the width of the subject vehicle with a margin. Further, the obstacle detected by the obstacle detection unit 101 may not be limited to the obstacle being detected by the obstacle detection unit 101, alternatively, the obstacle located at the blind spot of the peripheral monitoring sensor 20 whose detection point is managed by the detection result management unit 103.

It may be preferable that the avoidance determination unit 106 determines the necessity of avoiding the obstacle on the condition of the TTC (Time To Collision) for the obstacle, the distance of the obstacle, and the like in addition to the route of the subject vehicle. This is to avoid erroneous determination such that it is necessary to avoid the obstacle which is unlikely to be in close proximity. The TTC for an obstacle may be calculated from the obstacle distance and the vehicle speed of the subject vehicle detected by the vehicle speed sensor of the vehicle state sensor 30. As the obstacle distance, the one specified by the obstacle distance specifying unit 104 may be used.

The avoidance determination unit 106 determines that the obstacle is necessary to be avoided when the obstacle detection unit 101 detects an obstacle in the passage area of the subject vehicle and the TTC for the obstacle is less than the threshold value for TTC. On the other hand, if any of the conditions is not satisfied, it may be determined that avoidance of obstacles is unnecessary. The threshold value for TTC referred to here is a value for classifying whether or not it is possible to avoid obstacles with a margin, and can be arbitrarily set.

The avoidance determination unit 106 determines that it is necessary to avoid the obstacle when the obstacle detection unit 101 detects the obstacle in the passage area of the subject vehicle and the obstacle distance is less than the avoidance distance. On the other hand, if any of the conditions is not satisfied, it may be determined that avoidance of obstacles is unnecessary. The avoidance distance referred to here is a value for classifying whether or not the obstacle can be avoided with a margin, and can be arbitrarily set. The avoidance distance may be configured to increase as the vehicle speed of the subject vehicle increases, for example.

The warning processing unit 107 causes the warning device 40 to issue an alarm when the avoidance determination unit 106 determines that it is necessary to avoid an obstacle in a state where the warning device 40 does not issue an alarm. The warning processing unit 107 does not cause the warning device 40 to issue an alarm when the avoidance determination unit 106 determines that it is unnecessary to avoid an obstacle in a state where the warning device 40 does not issue an alarm. Even if the avoidance determination unit 106 determines that the obstacle avoidance is unnecessary after the warning is started, the warning processing unit 107 continues to control the warning device 40 to issue the warning when the obstacle distance specified by the obstacle distance specifying unit 104 is less than the predetermined threshold value. The predetermined threshold value is a value for classifying whether or not the distance between the vehicle and an obstacle is relatively short, and is a value that can be arbitrarily set. As an example, the predetermined threshold value may be 30 cm or less.

Here, an example of the mode of the warning in the warning device 40 according to the transition of the situation of the subject vehicle will be described with reference to FIG. 2. The HV in FIG. 2 indicates the subject vehicle. Ob in FIG. 2 indicates an obstacle. M in FIG. 2 indicates a mark indicating that an obstacle is detected.

Figure 2:
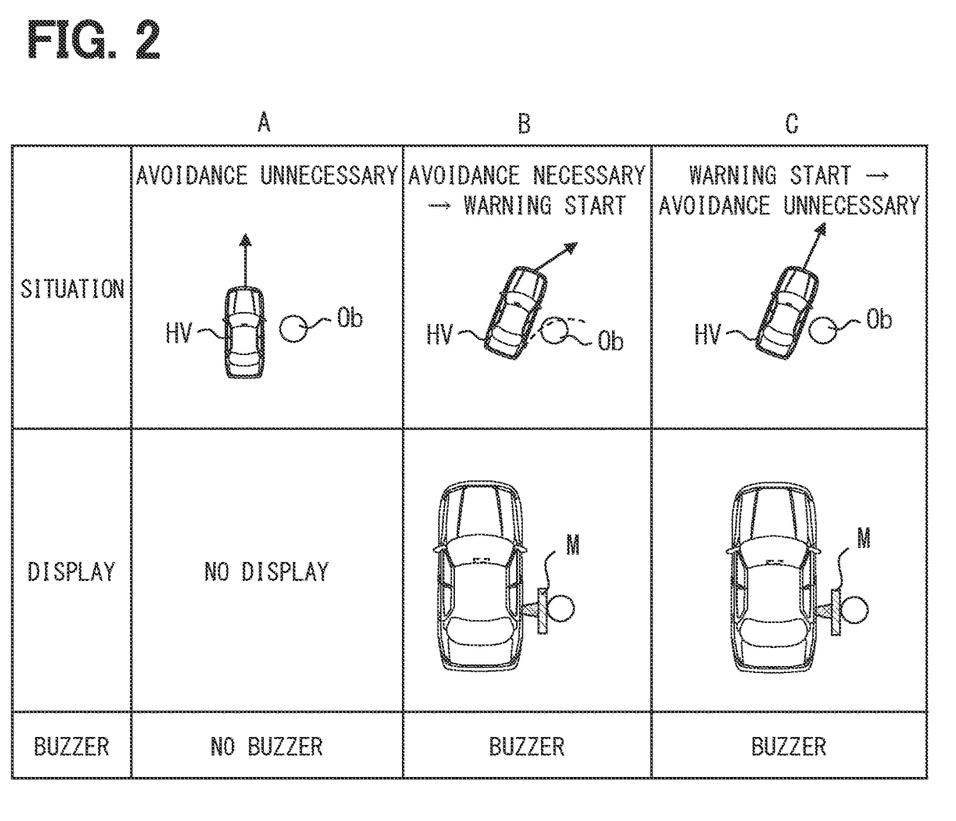
FIG. 2 is a diagram for explaining an example of an alarm mode in the alarm device according to a change in the situation of the subject vehicle.

In a situation where the avoidance determination unit 106 determines that it is not necessary to avoid the obstacle under a condition that the warning device 40 does not issue an alarm, the alarm on the display of the display device 41 and the alarm by the sound of the buzzer 42 are not issued (see A in FIG. 2).

Subsequently, in a situation where the avoidance determination unit 106 determines that it is necessary to avoid an obstacle under a condition that the warning device 40 does not issue an alarm, an alarm on the display of the display device 41 and an alarm by sounding the buzzer 42 are performed (See B in FIG. 2). As a display example, an image schematically showing the positional relationship between the vehicle HV and the obstacle is displayed on the screen, and a mark M indicating that the obstacle is detected is also displayed. This makes it possible for the driver of the subject vehicle to recognize that it is necessary to avoid the obstacle and to promote the avoidance of obstacle.

Then, even when the driver steers the vehicle while the warning device 40 does not issue an alarm, so that the avoidance determination unit 106 switches to a situation in which it is determined that the avoidance of the obstacle is unnecessary, both the warning on the display of the display device 41 and the warning by the ringing of the buzzer 42 are maintained in a case where the obstacle distance specified by the distance specifying unit 104 is less than the predetermined threshold value (see C in FIG. 2). As a result, even when the obstacle that is the target of the warning is avoided, the warning can be maintained if the obstacle is located at a relatively short distance of the subject vehicle.

Therefore, it is possible to prevent the driver from accidentally steering in a direction close to an obstacle by an alarm.

Up to this point, an example has been shown in which the predetermined threshold value is defined in one stage, alternatively, the predetermined threshold value may not be necessarily limited to this feature. It may be preferable that the predetermined threshold value is set in a plurality of stages having different distances. Hereinafter, two stages of a first setting threshold value having a shorter distance and a second setting threshold value having a longer distance are set as the predetermined threshold value. As an example, the first set threshold is 15 cm and the second set threshold is 30 cm.

When the avoidance determination unit 106 determines that avoidance of obstacles is unnecessary after the start of the warning, and further the obstacle distance specified by the obstacle distance specifying unit 104 is less than the set threshold value, the warning processing unit 107 may change the mode of the warning according to which the value is less than any of the set threshold values set in a plurality of stages. According to this, it becomes easier for the driver to recognize how close the vehicle is disposed to the obstacle due to the difference in the mode of the warning. This makes it easier for the driver to avoid the obstacle. In the example of the present embodiment, when the obstacle distance is less than the first set threshold value or the second set threshold value, the mode of the warning is changed based on whether the obstacle distance is equal to or more than the first set threshold value and less than the second set threshold value, or less than the first set threshold value.

Examples of the change in the mode of the warning include a configuration in which the type of the warning device 40 that issues an alarm is changed. Further, as a change in the mode of the warning, for example, a configuration for increasing or decreasing the types of the warning device 40 that issues an alarm can be adopted. Alternatively, as a change in the mode of the warning, a configuration in which the method for performing the warning of the warning device 40 having the same type is changed can be adopted.

Further, when the avoidance determination unit 106 determines that avoidance of an obstacle is unnecessary after the start of the warning, and further the obstacle distance specified by the obstacle distance specifying unit 104 is less than the set threshold value, the warning processing unit 107 may increase the number of types of the warning device 40 for issuing an alarm according to the obstacle distance becomes smaller than the set threshold value set to be shorter, while decreasing the number of types of the warning device 40 for issuing an alarm according to the obstacle distance becomes equal to or longer than the set threshold value set to be longer. According to this, the types of warnings are increased as the vehicle is closer to the obstacle, while the types of warnings are decreased as the vehicle is farther from the obstacle. Therefore, when the subject vehicle is closer to an obstacle and requires more attention, it promotes the attention to the driver by increasing the types of warning, while restricting the annoyance of the driver by reducing the types of warning when the subject vehicle is farther from the obstacle and requires less attention.

In the example of the present embodiment, the number of types of the warning device 40 that issues an alarm is increased in a case where the obstacle distance is less than the first set threshold value, as compared with the case where the obstacle distance is equal to or more than the first set threshold value and less than the second set threshold value. On the other hand, as compared with the case where the obstacle distance is less than the first set threshold value, the number of types of the warning device 40 for issuing an alarm is decreased when the obstacle distance is equal to or more than the first set threshold value and less than the second set threshold value.

Further, when the avoidance determination unit 106 determines that the avoidance of the obstacle is unnecessary after the warning is started, and further the obstacle distance specified by the obstacle distance specifying unit 104 is less than the set threshold value, and the number of types of the warning device 40 for issuing an alarm is reduced to one type, it may be preferable that the warning processing unit 107 controls the display device 41 to issue an alarm. Compared to the warning device 40 such as the buzzer 42, which is difficult to prevent the driver from receiving the warning due to the driver's action, the driver does not receive the warning from the display device 41 unless the driver looks at the screen, and it is easier to restrict the annoyance of the driver.

Here, an example of a warning mode in the warning device 40 according to the obstacle distance will be described with reference to FIGS. 3 to 6. The mark display of FIGS. 3 to 6 indicates a mode of displaying the above-mentioned mark M displayed on the display device 41. As the display mode of the mark M, there are a mode "red" in which the mark M is displayed in red, a mode "yellow" in which the mark M is displayed in yellow, and a mode "none" in which the mark M is not displayed. The intensity of the warning is stronger in red than in yellow because it is a warning color. The buzzer ringing in FIGS. 3 to 6 indicates a mode of ringing of the buzzer 42. As the mode of ringing the buzzer 42, there are a mode of continuously ringing "yes (continuous)", a mode of intermittently ringing "yes (intermittent)", and a mode of not ringing "no". The intensity of the alarm is stronger when it is sounded continuously than when it is sounded intermittently.

Figure 3:
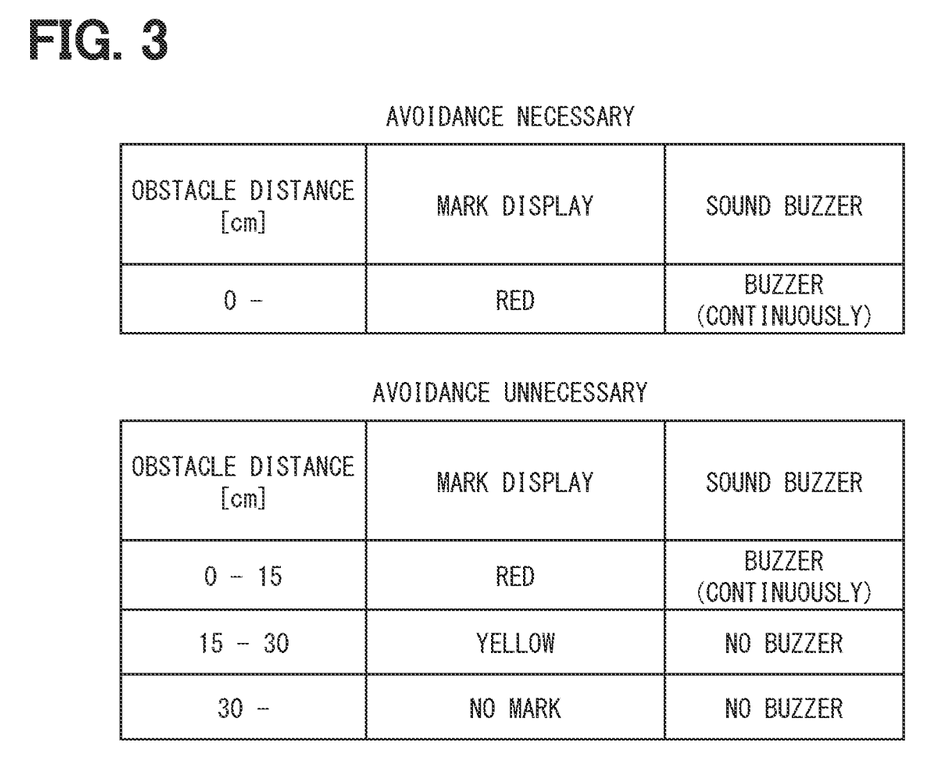
FIG. 3 is a diagram for explaining an example of an alarm mode in the alarm device according to an obstacle distance.

Further, the case where the obstacle distance in FIG. 3 is 0 to 15 indicates that the obstacle distance is from 0 cm or more to less than 15 cm, and corresponds to the case where the obstacle distance is less than the first set threshold value. The case where the obstacle distance in FIG. 3 is 15 to 30 indicates that the obstacle distance is from 15 cm or more to less than 30 cm, and corresponds to the case where the obstacle distance is not less than the first set threshold value and less than the second set threshold value. The case where the obstacle distance in FIG. 3 is 30 or more corresponds to the case where the obstacle distance is 30 cm or more and the obstacle distance is the second set threshold value or more.

As shown in FIG. 3, when the avoidance determination unit 106 determines that obstacle avoidance is necessary, both the display device 41 and the buzzer 42 issue the warning with the strongest intensity regardless of the obstacle distance specified by the obstacle distance specifying unit 104. That is, the mark M is displayed in red on the display device 41, and the buzzer 42 is continuously sounded.

On the other hand, when the avoidance determination unit 106 determines that avoidance of an obstacle is unnecessary after the start of the warning, as shown in FIG. 3, in a case where the obstacle distance is less than the first set threshold value, both the display device 41 and the buzzer 42 issue the warning with the strongest intensity and maintain the warning. That is, the mark M is displayed in red on the display device 41, and the buzzer 42 is continuously sounded. Further, when the obstacle distance is equal to or more than the first set threshold value and less than the second set threshold value, the warning is maintained although the mode is changed so as to reduce the intensity of the warning. Specifically, as shown in FIG. 3, the buzzer 42 is not sounded and the display device 41 displays the mark M in yellow. Further, when the obstacle distance is equal to or larger than the second set threshold value, the alarm is terminated. That is, as shown in FIG. 3, the buzzer 42 is not sounded and the mark M is not displayed on the display device 41.

Figure 4:
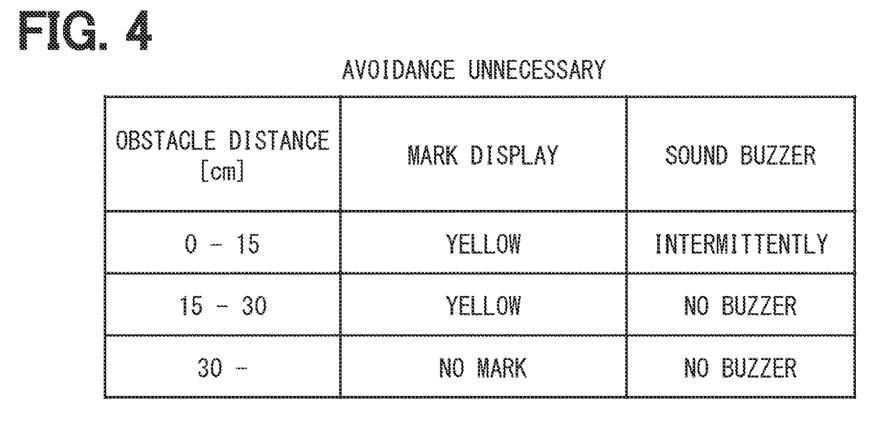
FIG. 4 is a diagram for explaining an example of an alarm mode in the alarm device according to an obstacle distance.
Figure 5:
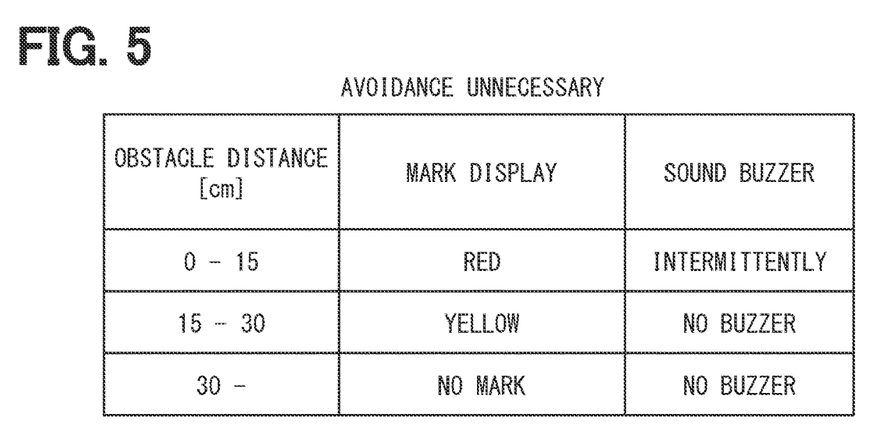
FIG. 5 is a diagram for explaining an example of an alarm mode in the alarm device according to an obstacle distance.
Figure 6:
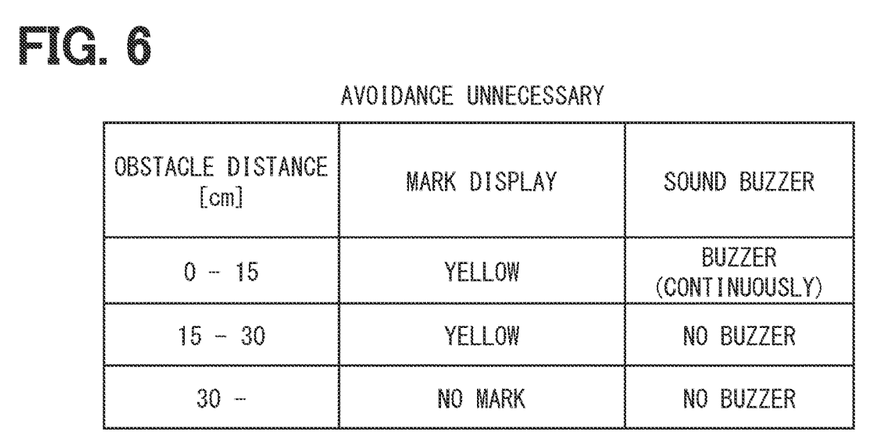
FIG. 6 is a diagram for explaining an example of an alarm mode in the alarm device according to an obstacle distance.

Further, when the avoidance determination unit 106 determines that the avoidance of the obstacle is unnecessary after the warning is started, and further the obstacle distance specified by the obstacle distance specifying unit 104 is less than the set threshold value, it may be preferable that the warning processing unit 107 changes the mode of the warning from before the avoidance determination unit 106 determines that the avoidance of the obstacle is unnecessary while continuing the warning from the warning device 40. This is to make the driver recognize that the obstacle exists at a relatively short distance of the subject vehicle by continuing the warning, and to make the driver recognize that the avoidance of the obstacle is no longer necessary. This makes it possible to suppress a failure in which the driver steers in a direction close to the obstacle without noticing the obstacle, even though it is no longer necessary to avoid the obstacle. Hereinafter, an example of this configuration will be described with reference to FIGS. 4 to 6.

when the avoidance determination unit 106 determines that avoidance of an obstacle is unnecessary after the start of the warning and the obstacle distance is less than the first set threshold value, both the display device 41 and the buzzer 42 issue the warning with a weaker intensity than before the avoidance determination unit 106 determines that the avoidance of an obstacle is unnecessary, and the warning is maintained. In the example of FIG. 4, the mark M is displayed on the display device 41 in yellow, which is weaker than red, and the buzzer 42 is sounded intermittently, which is weaker than continuous. Further, not limited to the example of FIG. 4, and it may be configured to weaken only the intensity of the warning from the buzzer 42 between the display device 41 and the buzzer 42. For example, as shown in FIG. 5, the display device 41 may display the mark M in red, while the buzzer 42 may be sounded intermittently with a weaker intensity than continuous. Further, as shown in FIG. 6, the display device 41 may display the mark M in yellow, which has a weaker alarm intensity than red, while the buzzer 42 may be continuously sounded.

When the avoidance determination unit 106 determines that avoidance of an obstacle is unnecessary after the start of the warning, and the obstacle distance is equal to or greater than the first set threshold value and less than the second set threshold value, only the display device 41 between the display device 41 and the buzzer 42 issues the warning with a weaker intensity than before the avoidance determination unit 106 determines that the obstacle avoidance is unnecessary, and maintains the warning. In the examples of FIGS. 4 to 6, the display device 41 displays the mark M in yellow, which has a weaker warning intensity than red, and the buzzer 42 does not sound. When the obstacle distance is equal to or greater than the second set threshold value, neither the display device 41 nor the buzzer 42 issues an alarm.

As described above, when the avoidance determination unit 106 determines that avoidance of an obstacle is unnecessary after the start of the warning, and further the obstacle distance is less than the first set threshold value or the second set threshold value (that is, less than the set threshold value), it may be preferable that the warning device 40 issues an alarm with a weaker intensity than before the avoidance determination unit 106 determines that avoidance of the obstacle is unnecessary, and the warning is maintained. According to this, by weakening the intensity of the warning while continuing the warning, it becomes easy to make the driver recognize that the obstacle has been avoided while keeping the driver's attention to the surroundings of the vehicle.

Further, when the warning device 40 issues an alarm with a weaker intensity than before the avoidance determination unit 106 determines that avoidance of an obstacle is unnecessary, it may be preferable to reduce the warning intensity of the plurality of types of warning devices 40 together. In the example of the present embodiment, it may be preferable that the strengths of the warnings of the display device 41 and the buzzer 42 are equalized and weakened. According to this, by uniformly weakening the warning intensities of the plurality of types of warning devices 40, it becomes easy to notice the change in the mode of the warning, and it becomes easy for the driver to recognize that the obstacle has been avoided.

It may be preferable that the set threshold value is fixed with respect to the above-mentioned avoidance distance that is changed according to the vehicle speed. This fixation is a fixation in the sense that it does not change according to the behavior of the vehicle, and does not exclude setting the value according to the driver. According to this, regardless of the behavior of the vehicle, it is possible to maintain the warning even when the obstacle is avoided under the condition that the obstacle distance is short. Therefore, when the obstacle distance is the same, the presence or absence of the warning does not switch depending on the behavior of the vehicle. Therefore, even though the obstacle is located at a relatively short distance of the subject vehicle, it is possible to suppress the failure that the warning is not maintained due to the behavior of the vehicle.

As described above, when the avoidance determination unit 106 determines that the avoidance of the obstacle is unnecessary after the warning is started, and further the obstacle distance is equal to or greater than the set threshold value, which is set to be the longest distance among a plurality of pre-set threshold values in a plurality of stages, the warning processing unit 107 controls the warning device 40 to terminate the warning. When the configuration in which the setting threshold value is set in a plurality of stages is not adopted and only one stage is set, the following may be performed. when the avoidance determination unit 106 determines that the avoidance of the obstacle is unnecessary after the warning is started, and further the obstacle distance specified by the obstacle distance specifying unit 104 is equal to or greater than the set threshold value, the warning processing unit 107 controls the warning device 40 to terminate the warning.

<Warning-Related Processing in the Peripheral Monitoring ECU 10>

Figure 7:
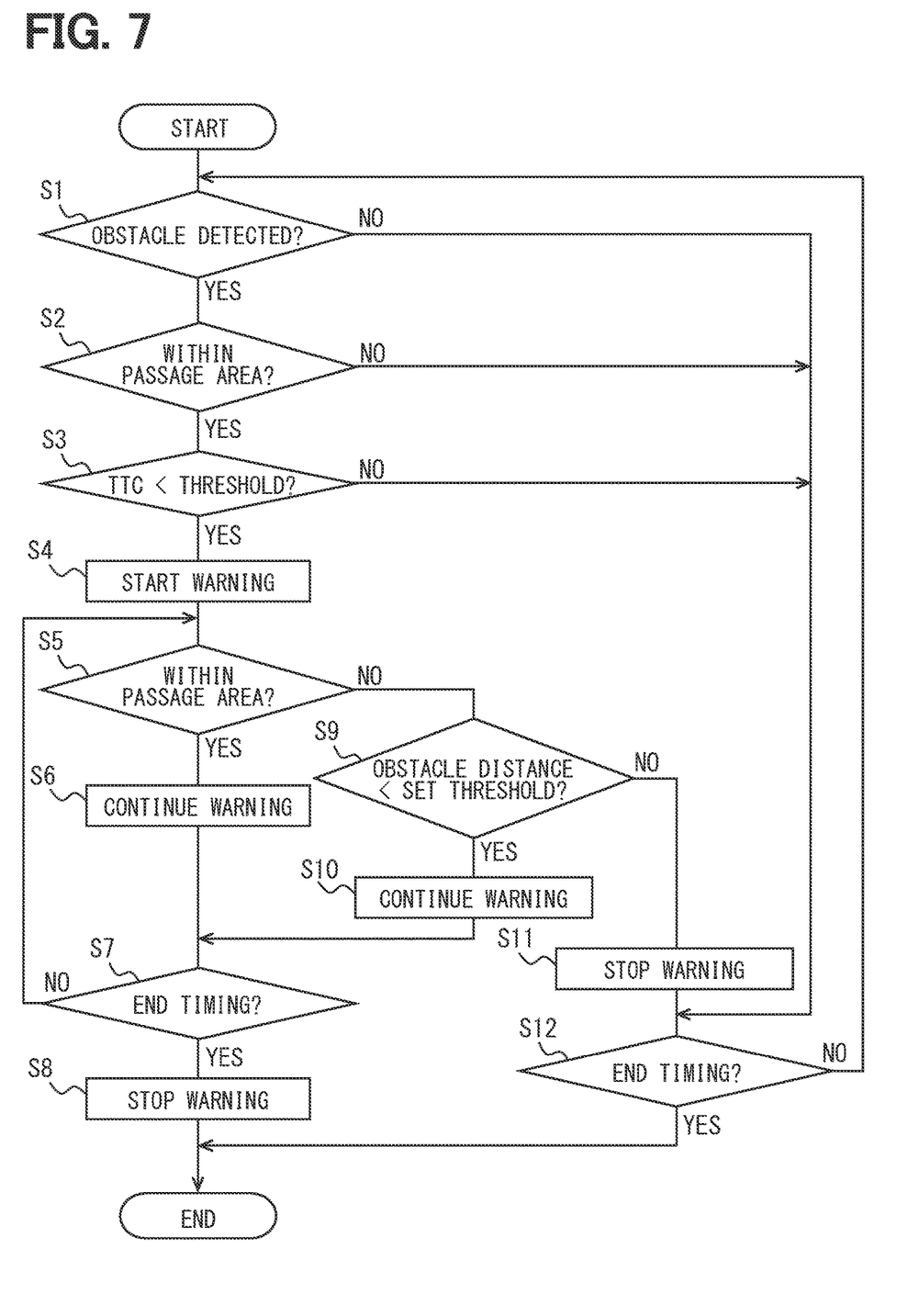
FIG. 7 is a flowchart showing an example of a flow of alarm-related processing in the peripheral monitoring ECU.

Here, an example of the flowchart of warning-related processing in the peripheral monitoring ECU 10 will be described with reference to the flowchart of FIG. 7. The execution of the steps included in the warning-related processing by the computer corresponds to the execution of the vehicle driving assistance method. The process shown in FIG. 7 may be configured to start in response to a switch for starting an internal combustion engine or a motor generator of the host vehicle being turned on. The switch for starting the vehicle is also referred to as a power switch. In addition, in the case of a configuration in which the necessity of warning-related processing can be switched, the configuration may be such that the power switch is turned on while the setting for performing warning-related processing is on. Alternatively, the configuration may be such that the warning-related processing is started when the setting for performing warning-related processing is switched from off to on while the power switch is on. In the example of FIG. 7, after the warning-related processing is started, the peripheral monitoring sensor 20 sequentially performs sensing, and the obstacle detection unit 101 also sequentially detects obstacles.

In step S1, when the obstacle detection unit 101 detects an obstacle (YES in S1), the process proceeds to step S2. On the other hand, if the obstacle detection unit 101 has not detected an obstacle (NO in S1), the process proceeds to step S12. When an obstacle is detected, the detection result management unit 103 sequentially updates and manages the position of the obstacle detection point in the XY coordinate system according to the change in the position of the subject vehicle.

In step S2, the avoidance determination unit 106 determines whether or not the obstacle detected in S1 is disposed in the passage area of the subject vehicle estimated from the route of the subject vehicle specified by the route specifying unit 105. Then, when the obstacle detected in S1 is included in the passage area (YES in S2), the process proceeds to step S3. On the other hand, when the obstacle detected in S1 is not included in the passage area (NO in S2), the avoidance determination unit 106 determines that avoidance of the obstacle is unnecessary, and it proceeds to step S12.

In step S3, the avoidance determination unit 106 determines whether or not the TTC for the obstacle is less than the threshold value for TTC. Then, when the TTC is less than the threshold value (YES in S3), the avoidance determination unit 106 determines that it is necessary to avoid the obstacle, and proceeds to step S4. On the other hand, when the TTC is equal to or higher than the threshold value (NO in S3), the avoidance determination unit 106 determines that avoidance of the obstacle is unnecessary, and proceeds to step S12.

In step S4, the warning processing unit 107 starts a warning by the warning device 40. In step S5, the avoidance determination unit 106 determines whether or not the obstacle detected in S1 is disposed in the passage area of the subject vehicle estimated from the route of the subject vehicle specified by the route specifying unit 105. As the position of the obstacle detected in S1, the position of the detection point of the obstacle that is sequentially updated by the detection result management unit 103 may be used. Then, when the obstacle detected in S1 is included in the passage area (YES in S5), the process proceeds to step S6. On the other hand, when the obstacle detected in S1 is not included in the passage area (NO in S5), the avoidance determination unit 106 determines that avoidance of the obstacle is unnecessary, and it proceeds to step S9.

In step S6, the warning processing unit 107 continues the warning by the warning device 40. In S6, for example, the warning processing unit 107 may be configured not to weaken the strength of the warning as compared with the time when the warning is started when the warning using the warning device 40 is continued.

In step S7, when it is the end timing of the warning-related processing (YES in S7), the process proceeds to step S8. On the other hand, when it is not the end timing of the warning-related processing (NO in S7), the process returns to S5 to repeat the process. As an example of the end timing of the warning-related processing, there is a case where the power switch of the subject vehicle is turned off, a case where the setting for performing the warning-related processing is switched from on to off, and the like. In step S8, the warning processing unit 107 ends the warning of the warning device 40, and ends the warning-related processing.

In step S9, the warning processing unit 107 determines whether or not the obstacle distance specified by the obstacle distance specifying unit 104 is less than the set threshold value. Then, when the obstacle distance is less than at least one set threshold value (YES in S9), the process proceeds to step S10. On the other hand, when the obstacle distance is equal to or greater than all the set threshold values (NO in S9), the process proceeds to step S11.

In step S10, the alarm processing unit 107 continues the warning using the warning device 40, and proceeds to step S7. In S10, for example, when the warning processing unit 107 continues the warning of the warning device 40, it may be preferable that the intensity of the warning is weakened as compared with the time when the warning is started.

In step S11, the warning processing unit 107 terminates the warning by the warning device 40. In step S12, when it is the end timing of the warning-related processing (YES in S12), the warning-related processing ends. On the other hand, when it is not the end timing of the warning-related processing (NO in S12), the process returns to S1 to repeat the process.

Brief of First Embodiment

According to the configuration of the first embodiment, even when the avoidance determination unit 106 determines that the obstacle avoidance is unnecessary after the warning is started due to the determination that the obstacle avoidance is necessary by the avoidance determination unit 106, in a case where the obstacle distance is less than the set threshold value, the warning from the warning device 40 is continued. Therefore, even when it is determined that avoidance of an obstacle is unnecessary, it is possible to continue the warning when the obstacle is located at a relatively short distance of the vehicle. When the alarm is continued, the vehicle driver will continue to pay attention to the surroundings, so that the driver can easily avoid proximity to the obstacle even if the obstacle is located relatively close to the vehicle. As a result, it becomes possible to make it easier to avoid the proximity to the obstacle after the obstacle that has been the target of the alarm has been avoided once.

Embodiment 2

In the first embodiment, the configuration in which the display device 41 and the buzzer 42 are used as the warning device 40 is described, alternatively, the device 40 may not be limited to this feature. For example, a device other than the display device 41 and the buzzer 42 may be used as the warning device 40 to issue a warning to the driver. For example, the driver may be alerted by the voice output from the voice output device. Further, the driver may be alerted by the vibration of the oscillator provided at the portion of the vehicle such as the steering wheel and the seat back where the driver comes into contact. Alternatively, the driver may be alerted by the light emitted from a light emitting element such as an LED.

Embodiment 3

In the first embodiment, the detection result management unit 103 sequentially updates the position of the detection point of the obstacle according to the change of the position of the subject vehicle, so that the obstacle located in the blind spot of the detection range of the peripheral monitoring sensor 20 is also targeted. However, the configuration may not be limited to this feature. For example, the peripheral monitoring ECU 10 may not be provided with the detection result management unit 103, and may be configured not to sequentially update the position of the detection point of the obstacle according to the change in the position of the subject vehicle.

Embodiment 4

Further, the configuration may not be limited to the first embodiment, and the functions of the peripheral monitoring ECU 10 may be shared and divided by a plurality of control devices.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A driving assistance device for a vehicle, comprising:
an obstacle detection unit that detects an obstacle in a periphery of the vehicle using a sensing result of a peripheral monitoring sensor for monitoring the periphery of the vehicle;
an avoidance determination unit that sequentially determines whether an avoidance of the obstacle detected by the obstacle detection unit is necessary, according to a route of the vehicle; and
a warning processing unit that controls a warning device to issue a warning when the avoidance determination unit determines that the avoidance of the obstacle is necessary, wherein:
in a case where the avoidance determination unit determines that the avoidance of the obstacle is unnecessary after starting the warning, the warning processing unit controls the warning device to continue issuing the warning when an obstacle distance, which is a distance of the obstacle to the vehicle, is less than a predetermined threshold value set in advance.

2. The driving assistance device for the vehicle according to claim 1, wherein:
the predetermined threshold value is set in a plurality of stages with different threshold distances; and
in a case where the avoidance determination unit determines that the avoidance of the obstacle is unnecessary after starting the warning, and the obstacle distance is less than the predetermined threshold value, the warning processing unit changes a mode of the warning based on which one of the threshold distances set in the plurality of stages the obstacle distance is less than.

3. The driving assistance device for the vehicle according to claim 2, wherein:
the warning processing unit controls a plurality of types of the warning device;
in a case where the avoidance determination unit determines that the avoidance of the obstacle is unnecessary after starting the warning, and the obstacle distance is less than one of the threshold distances set to be a shorter threshold distance, the warning processing unit increases a numerical number of types of the warning device for issuing the warning; and
in a case where the avoidance determination unit determines that the avoidance of the obstacle is unnecessary after starting the warning, and the obstacle distance is equal to or larger than one of the threshold distances set to be a longer threshold distance, the warning processing unit decreases the numerical number of types of the warning device for issuing the warning.

4. The driving assistance device for the vehicle according to claim 3, wherein:
the warning processing unit controls the plurality of types of the warning device, which includes at least a warning element for issuing the warning by a display, to issue the warning; and
in a case where the avoidance determination unit determines that the avoidance of the obstacle is unnecessary after starting the warning, the obstacle distance is less than the one of the threshold distances, and the warning processing unit decreases the numerical number of types of the warning device for issuing the warning to be one type based on which one of the threshold distances set in the plurality of stages the obstacle distance is less than, the warning processing unit controls one type of the warning device to issue the warning by the display.

5. The driving assistance device for the vehicle according to claim 2, wherein:
in a case where the avoidance determination unit determines that the avoidance of the obstacle is unnecessary after starting the warning, and the obstacle distance is equal to or larger than one of the threshold distances set to be a longest threshold distance among the threshold distances set in the plurality of stages, the warning processing unit controls the warning device to terminate the warning.

6. The driving assistance device for the vehicle according to claim 1, wherein:
in a case where the avoidance determination unit determines that the avoidance of the obstacle is unnecessary after starting the warning, and the obstacle distance is less than the predetermined threshold value, the warning processing unit changes a mode of the warning from a mode before the avoidance determination unit determines that the avoidance of the obstacle is unnecessary while the warning processing unit controls the warning device to continue issuing the warning.

7. The driving assistance device for the vehicle according to claim 1, further comprising:
   one or more processors; and
   a memory coupled to the one or more processors and storing program instructions that when executed by the one or more processors cause the one or more processors to provide at least: the obstacle detection unit; the avoidance determination unit; and the warning processing unit.

8. A driving assistance method for a vehicle comprising:
   detecting an obstacle in a periphery of the vehicle using a sensing result of a peripheral monitoring sensor for monitoring the periphery of the vehicle;
   sequentially determines whether an avoidance of the obstacle detected is necessary, according to a route of the vehicle;
   controlling a warning device to issue a warning when determining that the avoidance of the obstacle is necessary; and
   in a case where determining that the avoidance of the obstacle is unnecessary after starting the warning, controlling the warning device to continue issuing the warning when an obstacle distance, which is a distance of the obstacle to the vehicle, is less than a predetermined threshold value set in advance.

* * * * *